June 2, 1931.  C. LUYCKX  1,808,671
ROTARY DISTRIBUTION VALVE
Filed July 29, 1927    2 Sheets-Sheet 1

Inventor
Charles Luyckx
By B. Singer, Atty.

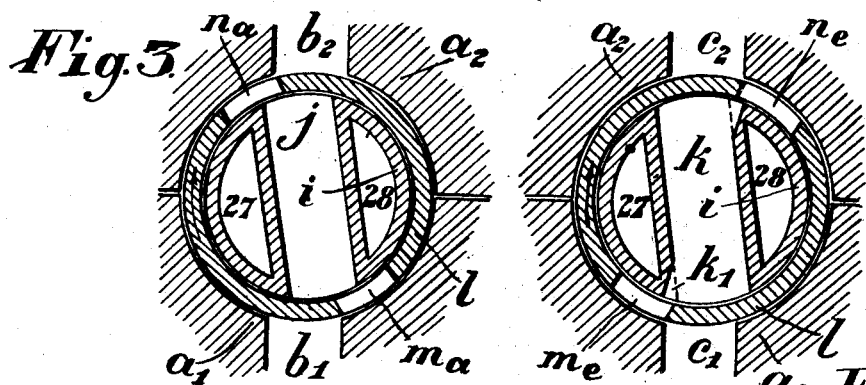
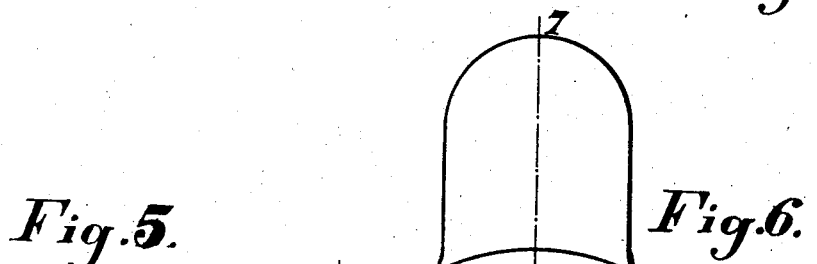
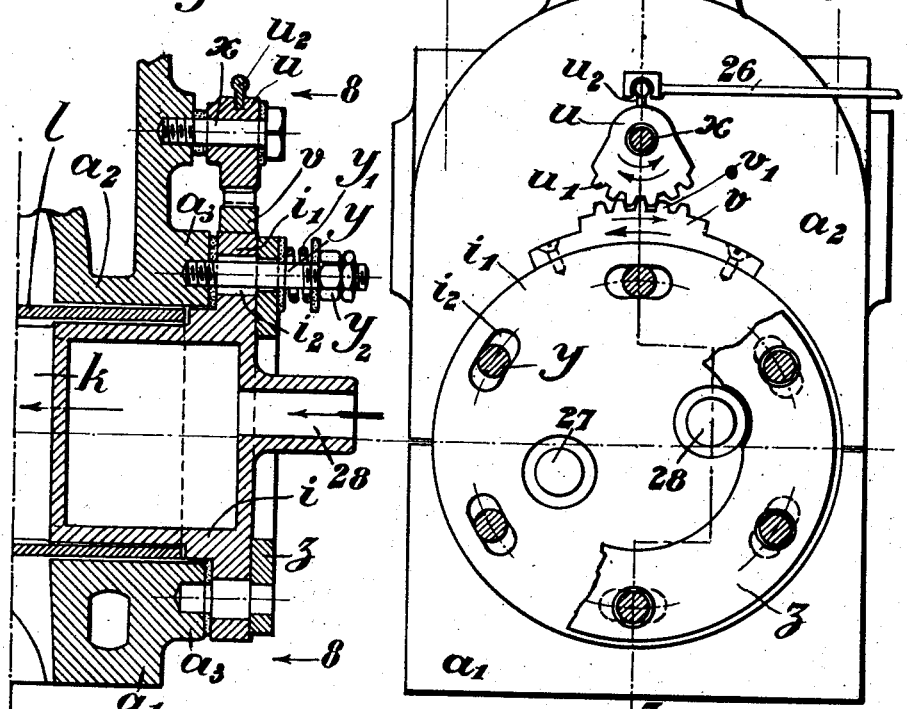

Patented June 2, 1931

1,808,671

UNITED STATES PATENT OFFICE

CHARLES LUYCKX, OF LOUVAIN, BELGIUM

ROTARY DISTRIBUTION VALVE

Application filed July 29, 1927, Serial No. 209,320, and in Belgium August 4, 1926.

The present invention consists in providing a distribution valve with rotating cylinder particularly adapted for use on internal combustion engines, which rotating cylinder is hollow and provided with diametrically opposite ports both for the admission and for the exhaust, the said distribution valve including a valve casing inside which the said cylinder rotates, the latter being mounted so as to be able to rotate on a fixed inner or central member provided with diametrical parallel passages which are located opposite the admission and exhaust passages provided diametrically opposite to each other in the valve casing so as to correspond.

According to the invention the above mentioned central member denoted a "fixed" inner member is to be considered as only "relatively fixed" in the sense that it can be angularly shifted within certain limits in each direction, relative to the "absolutely fixed" outer member, it being possible to effect such displacement at any moment and through the desired angle even during the operation of the engine. If the central member is absolutely fixed, the distribution adjustment can be modified to a certain extent by angularly displacing the rotating distribution valve relative to its driving means. Such a displacement in a suitable direction enables the beginning of the admission, for example, to be advanced, but the same advance is necessarily imparted to the beginning of the exhaust as well as to the end of the admission and of the exhaust.

The relative displacement in question does not therefore enable the beginning of one of the events to be adjusted independently of the end of the same event. It does not enable one event to be adjusted independently of another, either.

The said relative displacement enables an average adjustment to be obtained, which is approximately suitable for an average rate of engine speed, but which is no longer suitable for engines the speed of which must vary between very wide limits, as is the case at present with automobile engines.

In addition, the said relative displacement can only be effected when the engine is stopped.

However, it is well known that it would be extremely desirable to be able to adjust the distribution events of an automobile engine at will, during the operation of the said engine, so that the adjustment thus effected would be always suitable for the angular speed of the engine.

The use of an inner or central member capable of being angularly displaced in each direction at any time, at the will of the driver, enables the operating conditions of the engine to be perceptibly improved at all rates of speed.

The use of parallel diametrical passages in the fixed or shiftable central member and also in the outer fixed casing, in combination with the diametrical ports provided in the walls of the rotating distribution cylinder, enables the latter to control the admission and the exhaust on a four cycle engine although rotating at one fourth of the speed of the engine crank shaft.

The invention also provides for circulating cooling water inside the central fixed or shiftable member so as to continually cool the exhaust passages, while heating the intake passages as well as the fresh gas flowing through the latter, by the heat contained in the said cooling water.

The admission passages provided in the valve casing are connected on one side to the intake pipe fed by the carburetter and on the other side to the intake ports in the engine cylinders.

The exhaust passages in the said casing are connected on one side to the exhaust ports in the engine cylinders, and on the other side to the exhaust header.

The cylinder of the rotary distribution valve is driven from the engine crankshaft by means of a suitable transmission reducing the angular speed of the said crank shaft to one fourth of the said speed.

An example of a form of construction of a distribution valve with rotary cylinder, designed according to the invention and applied to an internal combustion engine, is diagrammatically represented, with alternatives, in the accompanying drawings, in which:

Fig. 3 is a cross section of a distribution valve with an angularly shiftable central member, the said member being shown in a position displaced in a direction opposite to the direction of rotation of the distribution cylinder, the section being taken on a plane through the admission passages.

Fig. 4 is a section similar to Fig. 3 but taken on a plane through the exhaust passages.

Fig. 5 is a partial longitudinal vertical section of the end of the distribution valve with shiftable central member and one-piece outer casing, the section being taken through the line 7—7 in Fig. 6, looking from the side on which the control for displacing the central member is located.

Fig. 6 is an end elevation looking in the direction of the arrows in Fig. 5.

Figure 1:
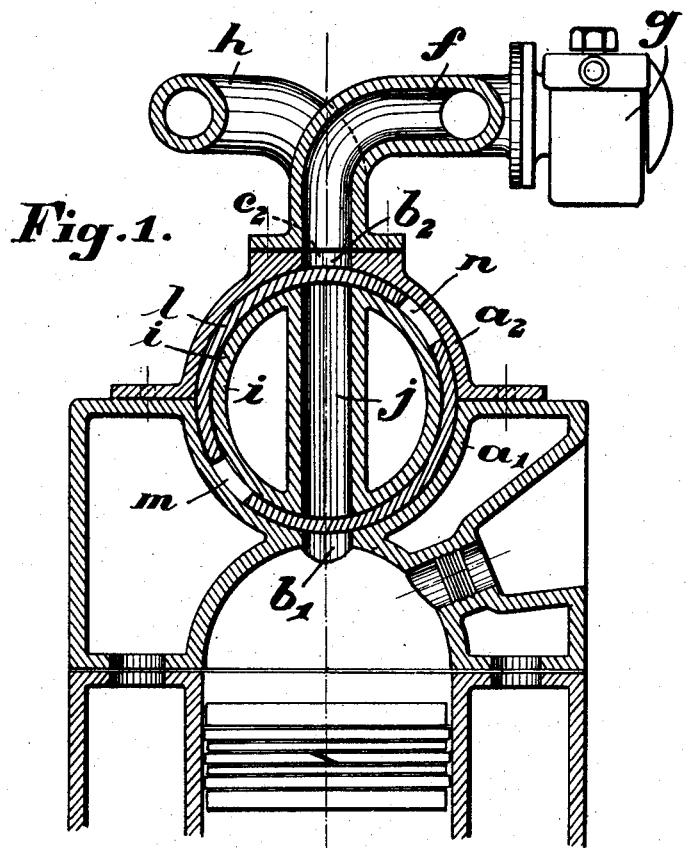
Fig. 1 is a vertical section of one of the engine cylinders and a cross section of the rotary distribution cylinder, the latter being located in a valve casing partially formed in the engine casing and having a movable cover.
Figure 2:
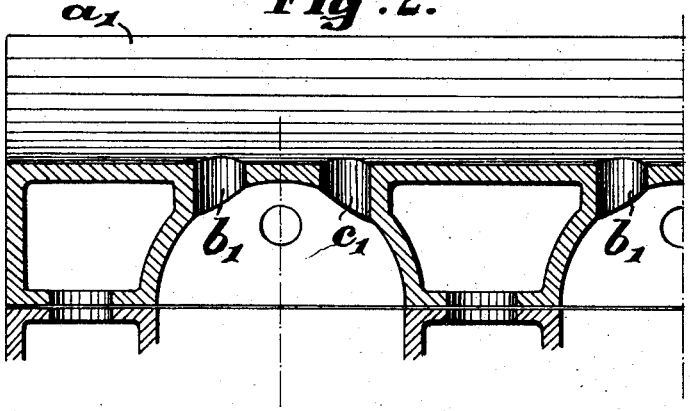
Fig. 2 is a partial longitudinal vertical section of the engine, the rotary cylinder and the upper half of the valve casing being removed.

In the form of construction shown in Figs. 1 to 3, the two-piece valve casing $a_1$ $a_2$ is located lengthwise above the set of engine cylinders, the lower half $a_1$ being formed in the cylinder casing and the upper half being removable.

The lower part $a_1$ of the said valve casing communicates with each cylinder through an admission port $b_1$ and an exhaust port $c_1$. The upper part $a_2$ of the casing communicates through a passage $b_2$ with the admission pipe $f$ connected to the carburettor $g$, and through a passage $c_2$ with the exhaust header $h$.

A fixed central tubular member $i$ is located concentrically in the distribution valve casing, the said member $i$ having diametrical parallel passages $j$—$k$ which are located respectively opposite the admission passages $b_1$—$b_2$ and the exhaust passages $c_1$ $c_2$ in the said casing. Cooling water is circulated in a longitudinal direction inside the central member $i$.

Between the said central member $i$ and the casing $a_1$ $a_2$ an annular space is left in which the distribution cylinder 1 can turn with a slight amount of friction, driven rotatively by the engine crankshaft (not represented) at an angular speed one fourth of that of the said crank shaft when the engine is a four cycle machine.

Along the cylinder $l$ are diametrically opposite ports $m$, $n$ which, at suitable times, establish communication between each engine cylinder and the admission pipe and exhaust header. The said ports have a larger area than the admission and exhaust passages provided in the distribution valve casing, so as to enable an average adjustment of the distribution to be made by causing the admission to open with a suitable retard and the exhaust to open with a suitable advance, as is correct for an average rate of engine speed.

The bore of the distribution valve casing can be slightly tapered. The exterior surface of the central distribution member $i$ is also tapered in the opposite direction to the taper of the valve casing bore, so as to leave an empty space, the longitudinal section of which is an elongated trapezoid, between the casing $a_1$ $a_2$ and the said central member $i$.

The distribution cylinder $l$ rotating between the two above mentioned parts is given the shape of the empty space in question.

On account of the tapers provided, the amount of play between the distribution cylinder and the fixed surfaces against which it turns can be easily adjusted. Such adjustment can be effected for example by means of a wedge section clamping ring such as $o$, bearing on one side against the end of the distribution valve casing and on the other side against a collar provided on the end of the cylinder $i$, the said collar being in the present case formed by the hub of the sprocket $p$ keyed into the said cylinder for the purpose of driving the latter from the crankshaft by a chain or any other suitable transmission.

Two or several washers $q$ are preferably inserted between the ring $o$ and the sprocket $p$ in order to insure that the joint will be tight.

The ring $o$ can be provided with teeth (not shown) on its two lateral faces, the said teeth engaging freely in corresponding notches provided on the end of the casing $a_1$ $a_2$ and in the adjacent washer $q$ for the purpose of preventing the rotary motion of the distribution cylinder from being imparted to the said ring.

The central member $i$ is provided at the end with the flanges $r$ and $s$ for connecting to the cooling water piping, the flange $r$ being in addition attached by means of bolts to a flange $t$ provided on one end of the distribution valve casing.

The valve casing can be completely independent of the engine casing or cylinder block. It can be designed so as fit on to the side of the group of cylinders so that it can be inserted between the said cylinders and the admission and exhaust piping.

In the case in which the distribution valve casing is made in two parts so as to enable the distribution cylinder to be inserted directly when the part forming a cover is removed, the invention provides that the said cylinder will be built with a series of collars located between the admission and exhaust ports and engaging in corresponding annular grooves provided in the interior wall of the above mentioned casing so as to prevent leaks.

According to the form of construction in Figs. 3 to 6 the central member $i$ is angularly shiftable relative to the exterior fixed member $a_1$ $a_2$ which exterior member can preferably be made in two parts.

As indicated precedingly, diametrical passages $j$ $k$ are provided in the central member, respectively for the admission and the exhaust, while, the diametrically opposite ports $m_a$, $n_a$, $m_e$, $n_e$ are provided respectively in the distribution cylinder $l$ for the admission and the exhaust.

The said central member $i$ with water circulation 27 and 28, has a collar $i_1$ at one end, in which collar segmental slots such as $i_2$ are cut for the passage of studs screwed into the machined end $a_3$ of the fixed member $a_1$, $a_2$.

The collar $i_1$ is held tightly against the machined end $a_3$ by a ring $z$ through which the studs pass and which is subjected to the elastic pressure of springs such as $y$, which pressure can be adjusted as desired by means of the nuts $y_2$.

A sector $v$ with teeth $v_1$ is mounted on the periphery of the collar $i_1$. The teeth $u_1$ of a sector $u$ mounted on a pivot $x$ rigidly attached to the casing $a_2$ engage the said teeth $v_1$, it being possible for the driver to operate the sector $u$ from a distance by means of a rod 26 connected to an arm $u_2$.

The advantages of the complementary regulation by displacement of the central body $i$ will be better understood by considering a concrete example.

It is supposed that, according to normal distribution admission begins at 0° and ends 40° after the lower dead center of the piston, while the opening to exhaust takes place 40° before the lower dead center of the piston, and that it closes at 0°, that is to say, at the upper dead center of the piston.

By examining the effect of regulating by angular displacement of the rotatory distribution about its mean position, the following conclusions are arrived at.

If, by displacement of the rotatory distributor, opening to admission is delayed 10°, there will be a delay of closure to admission of 40+10 or 50°. Such a delay of the end of the admission would be excessive at small speeds and could only be suitable for high performances.

To this delay of 10° for opening to admission will correspond a delay of 10° for the opening to exhaust.

The exhaust will therefore open 30° before the lower dead center of the piston, an amount which would only be acceptable at small speeds. Moreover the closure to exhaust will only take place 10° after the upper dead center of the piston, which is excessive.

It is easy to see that analogous drawbacks would result from a displacement of the distributor in the opposite direction for giving a lead to all stages of the distribution.

By advancing or retarding the beginning of one of the stages, all the stages will be necessarily affected and if the result obtained is the most favourable for one or for some, it is definitely unfavourable for all the others for a given motor performance.

The angular displacement of the rotatory distributor permits therefore to obtain an average regulation which is suitable for an average performance of the motor but which is not at all suitable when the speed of the motor is decidedly lower or decidedly higher than this mean performance.

For automobile motors as actually used, the speed of which must be capable of varying between very wide limits, the method of regulation described above is therefore most insufficient.

The complementary regulation, provided according to the invention, by the displacement at will of the central body of the distributor, permits of adjusting the regulation of the distribution to each kind of performance of the motor between the extreme limits of its speed of rotation.

It is to be noticed that an angular displacement of the said central body influences the position of one only of the edges of the passages provided in this body with respect to the passages provided in the external fixed body of the distributor. The other edge of the passages of the said central body is, in fact, constituted by the wall of the external fixed body.

The displacement of the central body under consideration permits in this way to act only on the beginning or on the end of the stages of the motor cycle, according to the direction in which this displacement is operated.

For delaying 10°, the beginning of the opening to admission it will be therefore sufficient to displace angularly the central body through 2½° in the direction of the rotation of the distributing cylinder, the latter rotating with one quarter of the speed of the crank shaft. The end of the closure to admission will remain unchanged.

The beginning of the opening to exhaust will be also delayed 10°, but the end of the closure to exhaust will remain unchanged.

In the case when it would be desirable for a similar displacement of the central body to obtain different effects on admission and on exhaust, it will suffice to provide, in this central body admission and exhaust passages having different dimensions transversely of the said body.

In order to advance by 10° the closure to admission it will suffice to displace the centrol body through 2½° backwards, that is, in the direction opposite to the direction of rotation of the distributing cylinder. The beginning of admission will then remain unchanged.

This same displacement does not modify the beginning of the opening to exhaust, but gives an advance of 10° to the closure to exhaust.

In order to avoid that this closure to exhaust should ever take place before the upper dead centre of the piston which would cause a compression of the burnt gases in the cylinder, at the end of the fourth phase of the cycle, the closing edges of all the exhaust passages are, according to this invention, bevelled or turned back at $k$ (Fig. 2).

If the edges of the opening of the passages $k$ are also turned back, the same effect will be obtained as if these passages had been given in a direction transverse to the central body, a greater size than that of the admission passages $j$.

What I claim is:

1. In an internal combustion engine, a valve casing having a cross-sectionally cylindrical chamber provided with an inlet port and an exhaust port for each engine cylinder, a tubular valve element fitted in said chamber and having diametrical inlet and exhaust ports for each engine cylinder, and a central core element in said valve element and having diametrical conduits corresponding with said inlet and exhaust ports, said core element being arranged for relative angular movement with said valve casing.

2. Valve mechanism as claimed in claim 1, including a toothed segment on the core element, a segment gear mounted for engagement with said segment, and means to impart oscillating movement to said segment gear, so that the relative angle of the central core with respect to the valve casing may be changed.

3. Valve mechanism as claimed in claim 1, in which the tubular valve element is arranged for rotating movement and the central core element is arranged for movement so that the relative angle thereof may be changed with respect to the valve casing.

In witness whereof I affix my signature.

CHARLES LUYCKX.